United States Patent
Lee et al.

(10) Patent No.: US 10,521,108 B2
(45) Date of Patent: Dec. 31, 2019

(54) ELECTRONIC APPARATUS FOR DETECTING TOUCH, METHOD OF CONTROLLING THE SAME, AND DISPLAY APPARATUS INCLUDING TOUCH CONTROLLER

(71) Applicant: SAMSUNG ELECTRONICS CO., LTD., Suwon-si (KR)

(72) Inventors: Sun Rock Lee, Cheonan-si (KR); Yong Min Jung, Suwon-si (KR); Jeong Shan Na, Hwaseong-si (KR); Han Jin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/689,091

(22) Filed: Aug. 29, 2017

(65) Prior Publication Data
US 2018/0101300 A1 Apr. 12, 2018

(30) Foreign Application Priority Data
Oct. 10, 2016 (KR) .......................... 10-2016-0130581

(51) Int. Cl.
  *G06F 3/033* (2013.01)
  *G06F 3/0488* (2013.01)
  *G06F 3/0354* (2013.01)
  *G06F 3/041* (2006.01)

(52) U.S. Cl.
  CPC ...... *G06F 3/04886* (2013.01); *G06F 3/03545* (2013.01); *G06F 3/0412* (2013.01); *G06F 3/0416* (2013.01)

(58) Field of Classification Search
  CPC .... G06F 3/041; G06F 3/04886; G06F 3/0412; G06F 3/0416; G06F 3/03545
  USPC ............................... 345/173, 179; 178/19.01
  See application file for complete search history.

(56) References Cited

U.S. PATENT DOCUMENTS

| 9,483,146 | B2 | 11/2016 | Davidson et al. |
| 9,817,490 | B2 * | 11/2017 | Zhang ................. G06F 3/03545 |
| 2011/0012855 | A1 * | 1/2011 | Yeh ....................... G06F 3/0416 345/173 |

(Continued)

FOREIGN PATENT DOCUMENTS

| KR | 10-2010-0020389 A | 2/2010 |
| KR | 10-2013-0123691 A | 11/2013 |

(Continued)

OTHER PUBLICATIONS

Search Report and Written Opinion dated Nov. 28, 2017, issued by the International Searching Authority in counterpart International Patent Application No. PCT/KR2017/009139 (PCT/ISA/210 and PCT/ISA/237).

*Primary Examiner* — Adam J Snyder
(74) *Attorney, Agent, or Firm* — Sughrue Mion, PLLC (57) ABSTRACT

An electronic apparatus includes a memory that stores a specified criterion for classifying a type of a touch region according to an assigned function, and a processor that classifies at least one touch region as belonging to a palm region for assigning a first function or to a pen region for assigning a second function based on the specified criterion if a touch to a touch panel is detected, issues an individual identifier (ID) for the pen region, and issues a group ID after performing grouping for the palm region.

17 Claims, 7 Drawing Sheets

(56) References Cited

U.S. PATENT DOCUMENTS

| | | | |
|---|---|---|---|
| 2011/0291944 A1* | 12/2011 | Simmons | G06F 3/0416 345/173 |
| 2012/0182238 A1* | 7/2012 | Lee | G06F 3/0416 345/173 |
| 2012/0293454 A1* | 11/2012 | Tsai | G06F 3/0416 345/174 |
| 2013/0234957 A1* | 9/2013 | Shirato | G06F 3/0416 345/173 |
| 2013/0293495 A1 | 11/2013 | Choi et al. | |
| 2013/0300696 A1* | 11/2013 | Haran | G06F 3/041 345/173 |
| 2013/0328832 A1* | 12/2013 | Boumgarten | G06F 3/0418 345/174 |
| 2014/0104191 A1* | 4/2014 | Davidson | G06F 3/04883 345/173 |
| 2014/0104225 A1 | 4/2014 | Davidson et al. | |
| 2015/0185923 A1 | 7/2015 | Yoon | |
| 2015/0355739 A1* | 12/2015 | Hong | G06F 3/0418 345/174 |
| 2016/0098142 A1* | 4/2016 | Winebrand | G06F 3/0416 345/174 |
| 2017/0090617 A1* | 3/2017 | Jang | G06F 3/0416 |

FOREIGN PATENT DOCUMENTS

| | | |
|---|---|---|
| KR | 10-2015-0080842 A | 7/2015 |
| WO | 2016/052963 A1 | 4/2016 |
| WO | 2016/111062 A1 | 7/2016 |

* cited by examiner

ELECTRONIC APPARATUS FOR DETECTING TOUCH, METHOD OF CONTROLLING THE SAME, AND DISPLAY APPARATUS INCLUDING TOUCH CONTROLLER

CROSS-REFERENCE TO RELATED APPLICATION(S)

This application claims the benefit under 35 U.S.C. § 119(a) of a Korean patent application filed on Oct. 10, 2016 in the Korean Intellectual Property Office and assigned Korean Patent Application No. 10-2016-0130581, the entire disclosure of which is hereby incorporated by reference.

TECHNICAL FIELD

The present disclosure relates to an electronic apparatus providing a touch interface, a method of controlling the same, and a display apparatus.

BACKGROUND

Recently, touchscreen interfaces have been increasingly applied to display apparatuses. In the case of the touchscreen interface, a user may more easily perform handwriting, figure drawing, or the like as compared with that of a keypad interface.

On the screen of the touchscreen interface based on a figure drawing function, input tools, such as a drawing input tool, an erasing input tool, a coloring input tool, or the like, may be displayed on a menu window. The user may select a drawing input tool from the menu window to draw a figure, may select a coloring input tool to fill color in the drawn figure, or may select an erasing input tool from the menu window to erase the drawn figure.

SUMMARY

Through the touchscreen interface, the user may select an input function such as a drawing function, a handwriting function, a coloring function, or the like, and an erasing function to delete input content through an input tool.

Aspects of the present disclosure are to address at least the above-mentioned problems and/or disadvantages and to provide at least the advantages described below. Accordingly, an aspect of the present disclosure is to provide an electronic apparatus capable of selecting one of a plurality of functions based on at least one of a size, a shape, and the number of touch regions, a method of controlling the same, and a display apparatus.

In accordance with an aspect of the present disclosure, an electronic apparatus includes a memory that stores a specified criterion for classifying a type of a touch region according to an assigned function, and a processor that classifies at least one touch region as belonging to a palm region for assigning a first function or to a pen region for assigning a second function, based on the specified criterion if a touch to a touch panel is detected, issues an individual identifier (ID) for the pen region, and issues a group ID after performing grouping for the palm region.

In another aspect of the present disclosure, a display apparatus includes a touch controller that classifies at least one touch region as belonging to a palm region or to a pen region based on a specified criterion if a touch to a touch region panel is detected, issues an individual identifier (ID) if the at least one touch region is classified as belonging to the pen region, and issues a group ID after performing grouping if the at least one touch region is classified as belonging to the palm region, and a processor that if the issued ID is received, determines whether an area of a touch region corresponding to the issued ID is equal to or more than a specified threshold area, assigns a first function to a touch region having an area equal to or more than the specified threshold area, and assigns a second function to a touch region having an area less than the specified threshold area.

In another aspect of the present disclosure, a method of controlling an electronic apparatus includes classifying at least one touch region as belonging to a palm region for executing a first function or to a pen region for executing a second function based on a specified criterion if a touch to a touch panel is detected, issuing an individual identifier (ID) if the at least one touch region belongs to the pen region, and issuing a group ID after performing grouping if the at least one touch region belongs to the palm region.

According to the present disclosure, the use convenience of a user for the touch interface may be improved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Hereinafter, certain embodiments of the present disclosure may be described with reference to accompanying drawings. Accordingly, those of ordinary skill in the art will recognize that modifications, equivalents, and/or alternatives on the various embodiments described herein may be made without departing from the scope and spirit of the present disclosure.

Figure 1:
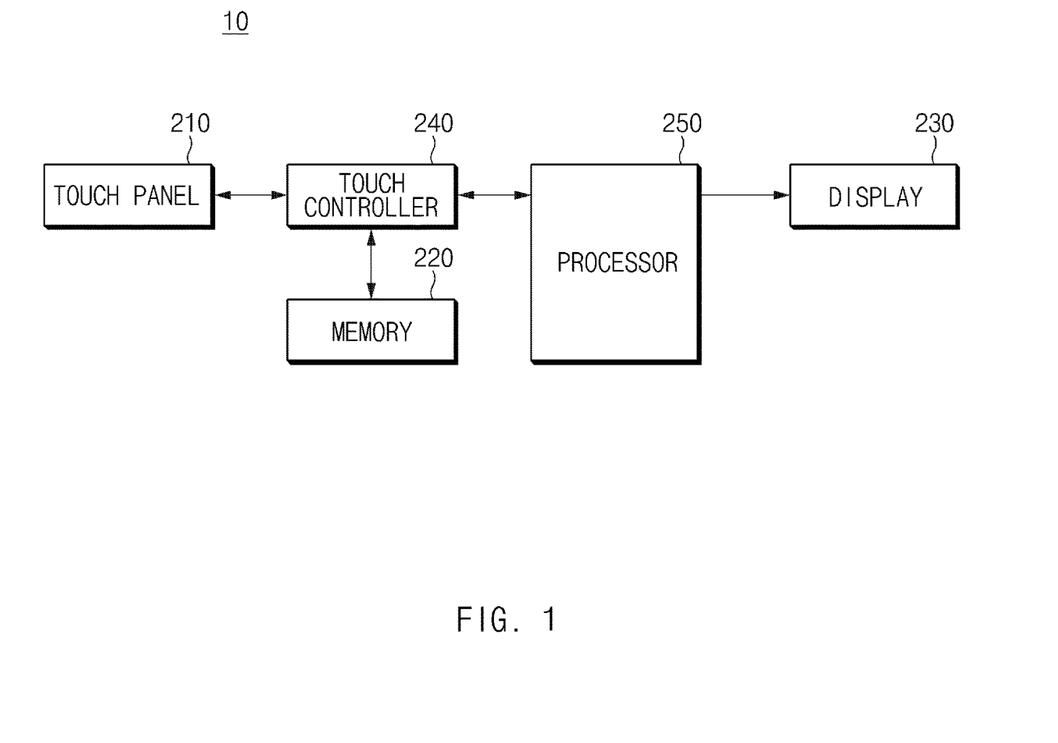
FIG. 1 is a block diagram illustrating a display apparatus according to an exemplary embodiment of the present disclosure.

FIG. 1 is a block diagram illustrating a display apparatus according to an exemplary embodiment of the present disclosure. According to various embodiments, a display apparatus 10 may include at least one of a television (TV), a monitor, a laptop computer, a large format display (LFD), a smartphone, a tablet personal computer (PC), a mobile phone, a video telephone, an e-book reader, a desktop personal computer, a netbook computer, a personal digital assistant (PDA), a portable multimedia player (PMP), an MP3 player, a camera, and a wearable device.

As illustrated in FIG. 1, according to the exemplary embodiment of the present disclosure, the display apparatus 10 may include a touch panel 210, a memory 220, a display 230, a touch controller 240, and a processor 250. According to an exemplary embodiment of the present disclosure, at least one element of the display apparatus 10 may be omitted. According to an exemplary embodiment of the present disclosure, the display apparatus 10 may be divided into a plurality of devices. For example, the display apparatus 10 may be classified into a touch control device for a touch interface and a display device for a display function. In this case, the touch control device may include the touch controller 240 and the touch panel 210, and the display device may include the processor 250 and the display 230. In this case, the touch control device may communicate with the display device through various wired/wireless interfaces. In addition, the memory 220 may be included in each of the touch control device and the display device.

According to various embodiments, the touch panel 210 may serve as a device which receives a user touch. The touch panel 210 may be substituted with, for example, at least one of a touch pad or a touch screen. The user touch may be a touch input by a finger of the user, a stylus pen, or the like. According to various embodiments, the touch input may include a hovering input as well as an input formed by a physical contact. According to various embodiments, the touch panel 210 may recognize a touch input in at least one of capacitive, resistive, infrared, and ultrasonic touch schemes. The touch panel may further include a control circuit. In the case of the capacitive touch scheme, the touch panel 210 may allow a physical contact or proximity recognition.

According to various embodiments, the memory 220 may store first information (e.g., a classification criterion and an ID classification system) for touch control. According to various embodiments, the classification criterion may include at least one of a reference shape, a threshold number, a threshold distance, and a threshold area. The threshold distance, the threshold area, and the reference shape may be empirically or experimentally determined by using a distance, an area, and a shape recognized when a plurality of fingers of a user are touched. The threshold number may be at least three. According to various embodiments, in the case that the memory 220 is embedded in the touch controller 240, the first information may be stored in the embedded memory of the touch controller 240.

According to various embodiments, the memory 220 may store second information (e.g., at least one of information on an issued identifier (ID) and information on the threshold area) for function assignment. The information on the issued ID information may be information on an ID received from the touch controller 240. The information on the threshold area may be a reference for determining whether a region corresponding to each ID belongs to a palm region or a pen region. According to various embodiments, in the case that a memory is embedded in the processor 250, the second information may be stored in the embedded memory of the processor 250.

According to various embodiments, the display 230 may output an image according to an instruction of the processor 250. According to various embodiments, the display 230 may include, for example, at least one of a liquid crystal display (LCD), a light-emitting diode (LED) display, an organic LED (OLED) display, a microelectromechanical systems (MEMS) display, an electronic paper display, a plasma display panel (PDP), and a three dimensional (3D) display. The display 230 may display, for example, various pieces of content (e.g., a text, an image, a video, an icon, or a symbol) for a user. According to various embodiments, the display 230 and the touch panel 210 may be integrated with each other in the form of a single module. For example, the touch panel 210 and the display 230 may be integrated into a touch screen including a touch panel.

According to various embodiments, if the touch controller 240 detects a touch on the touch panel 210, the touch controller 240 may determine at least one of information on coordinates of a touch region and information on a size of the touch region to determine whether the touch is a new touch. For example, the touch controller 240 may determine the coordinates and the size of the touch region of the detected touch and may determine whether the coordinates and the size of the touch region of the detected touch are matched with the coordinates and the size of a previous touch region. If the coordinates and the size of the touch region of the detected touch are matched with the coordinates and the size of the previous touch region, the touch controller 240 may determine the touch region of the detected touch as the previous touch area, and, otherwise, the touch controller 240 may determine the detected touch as the new touch. According to various embodiments, the touch controller 240 may detect the size of the touch region by using the coordinates and the total number of touch cells, in which the touch is detected, among a plurality of touch cells included in the touch panel.

According to various embodiments, in the case of the new touch, the touch controller 240 may assign an individual ID to the touch region of the new touch. The touch controller 240 may detect and generate region information on the touch region assigned with the ID and may store the ID and the region information in the memory 220 while linking the ID and the region information with each other. The region information may include at least one of size information and position information. For example, the touch controller 240 may generate the size information and the position information by using the positions and the number of touch cells.

According various embodiments, the touch controller 240 may classify the touch region assigned with the ID as belonging to a palm region or to a pen region according to a specified classification criterion. The palm region is a touch region assigned with a first function and the pen region is a touch region assigned with a second function. For example, the touch controller 240 may classify touch regions, which are determined at a present time point, as belonging to a palm region, if at least one condition is satisfied among conditions that the total number of the touch regions determined at the present time point is equal to or more than a threshold number, the distance between the touch regions is less than a threshold distance, the whole area of the touch regions is equal to or more than the threshold area, and the whole shape formed by the touch regions corresponds to a reference shape. Alternatively, the touch controller 240 may classify the touch regions as belonging to the palm region if the distance, which is made between touch regions (e.g., touch regions which are the farthest apart from each other) among touch regions determined as being in the threshold number (e.g., three) at the present time point, is equal to or less than the threshold distance.

In addition, the touch controller 240 may classify touch regions as belonging to the pen region if at least one condition is satisfied among conditions that the number of the touch regions is less than the threshold number, the distance between the touch regions is equal to or more than the threshold distance, the whole area of the touch regions is less than the threshold area, and the shape formed by the touch regions does not corresponds to a reference shape.

According to various embodiments, the touch controller 240 may perform grouping with respect to touch regions classified as belonging to the palm region and may compute region information on the grouped region (palm region) again. The region information may include the area and the reference position of the grouped region. For example, the area of the grouped region may be the whole area of touch regions belonging to the palm region, or may be the area of some of touch regions belonging to the palm region. For example, the reference position may have the largest x and y coordinates or the smallest x and y coordinates in the palm region or may be the central position. The area and the reference position of the palm region may be calculated based on a specified criterion.

According to various embodiments, the touch controller 240 may transmit (issue) the ID of the classified touch region and the region information to the processor 250 while linking the ID and the region information with each other. According to various embodiments, the touch controller 240 may issue an individual ID and region information in the case of the pen region. In the case of the palm region, the touch controller 240 may newly assign a group ID to the palm region and may issue the group ID and region information while linking the group ID and the region information with each other.

According to various embodiments, the touch controller 240 may track a touch region having the issued ID to determine whether the type of the touch region is changed. According to various embodiments, the touch controller 240 may determine the change in the type of the touch region by determining at least one of the change in the number of touch regions, the change in the area of the touch regions, the change in the distance between touch regions, and the change in the shapes of the touch regions, which are determined at a present time point. The touch controller 240 may again classify the type of the touch region if the type of the touch region is changed. For example, the touch controller 240 may again classify each of the touch regions, which belong to the palm region, as belonging to a pen region if at least one condition is satisfied among conditions that the number of touch regions belonging to the palm region is decreased to less than the threshold number, the distance between the touch regions is increased to the threshold distance or more, and the area of the palm region is decreased to less than the threshold area. According to various embodiments, if the touch regions are again classified, the touch controller 240 may again issue IDs (or may assign and issue the IDs). The touch controller 240 may again issue the IDs in a link with IDs which are previously issued.

According to various embodiments, in the case that the types (e.g., the palm region and the pen region) of the touch regions are again classified, the touch controller 240 may again assign the touch region with an ID and may again issue the ID of the touch region. For example, if touch regions belonging to the palm region are again classified as belonging to the pen region, the touch controller 240 may again issue individual IDs instead of the group ID. In addition, if touch regions belonging to the pen region are again classified as belonging to the palm region, the touch controller 240 may again issue a group ID instead of individual IDs.

For example, according to various embodiments, the touch controller 240 may periodically classify the types of the touch regions again when executing a specified application, and may issue IDs according to the types of the touch regions. For example, the touch controller 240 may classify the types of the touch regions according to the instruction of the processor 250 which has sensed the execution of the specific application and may issue IDs according to the types of the touch regions. The specified application may be an application (e.g., an interactive white board) for a drawing function.

For example, the touch controller 240 may include at least one of a central processing unit (CPU), an application processor (AP), a touch screen panel integrated circuit (TSP IC), a microcontroller unit (MCU), a graphic processing unit (GPU), an application specific integrated circuit (ASIC), a field programmable gate array (FPGA) and a digital signal processor (DSP).

According to various embodiments, the processor 250 may instruct the touch controller 240 to classify the types of the touch regions if the specified application is executed. For example, the specified application may be an application for a drawing function.

According to various embodiments, if the processor 250 receives a new ID from the touch controller 240, the processor 250 may determine a function assigned to a region corresponding to the new ID based on the region information. For example, the processor 250 may determine, by using the size information included in the region information, whether the size of the region corresponding to the new ID is equal to or more than the threshold area.

According to various embodiments, if the size of the region corresponding to the new ID is equal to or more than the threshold area, since the region is the palm region, the processor 250 may assign a first function to the region. If the size of the region corresponding to the new ID is less than the threshold area, since the region is the pen region, the processor 250 may assign a second function to the region. The first function may be an eraser function for erasing displayed content, and the second function may include at least one of a handwriting function, a figure drawing function, a coloring function, a zoom-in function, and a zoom-out function.

According to various embodiments, the processor 250 may execute the second function in the region corresponding to the pen region and may execute the eraser function in the region corresponding to the palm region, on the screen displayed on the display 230.

According to various embodiments, if the processor 250 receives the new ID (or newly issued ID) from the touch controller 240, the processor 250 may assign the first function or the second function based on the area of relevant touch regions. For example, if the processor 250 receives the new ID, the processor 250 may determine whether the area of the touch regions is equal to or more than the specified threshold area based on the group information or the individual information of the touch regions. The processor 250 may assign the first function to the touch regions which represent an area of the threshold area or more, and the second function to the touch regions which represent an area of less than the threshold area. The first function may be an eraser function and the second function may be an input function of at least one of a zoom-in function, a zoom-out function, a handwriting function, a figure drawing function, and a coloring function. Alternatively, the first function and the second function may be other functions different from each other.

For example, the processor 250 may include at least one of a CPU, an AP, a TSP IC, an MCU, a GPU, an ASIC, a FPGA, and a DSP.

According to various embodiments, the touch controller 240 and the processor 250 may be connected with each other through a first interface. For example, the first interface may be at least one of wired interfaces such as USB, RS232, RS485, I2C, or PS2. The first interface may be a wireless interface such as Bluetooth, WiFi, or the like. According to various embodiments, a communication module for the first interface may be embedded in each of the touch controller 240 and the processor 250. For example, the first interface may be at least one of wired interfaces such as USB, RS232, RS485, I2C, or PS2.

According to various embodiments, as a function for each touch region is determined based on an ID issued (or grouped and then issued) after the type of a touch is determined, the touch intention by a user at a present time point may be exactly detected. According to various embodiments, since a processing load by a main processor being in the charge of the display 230 is reduced, the implementation cost and price of the main process may be reduced.

Figure 2:
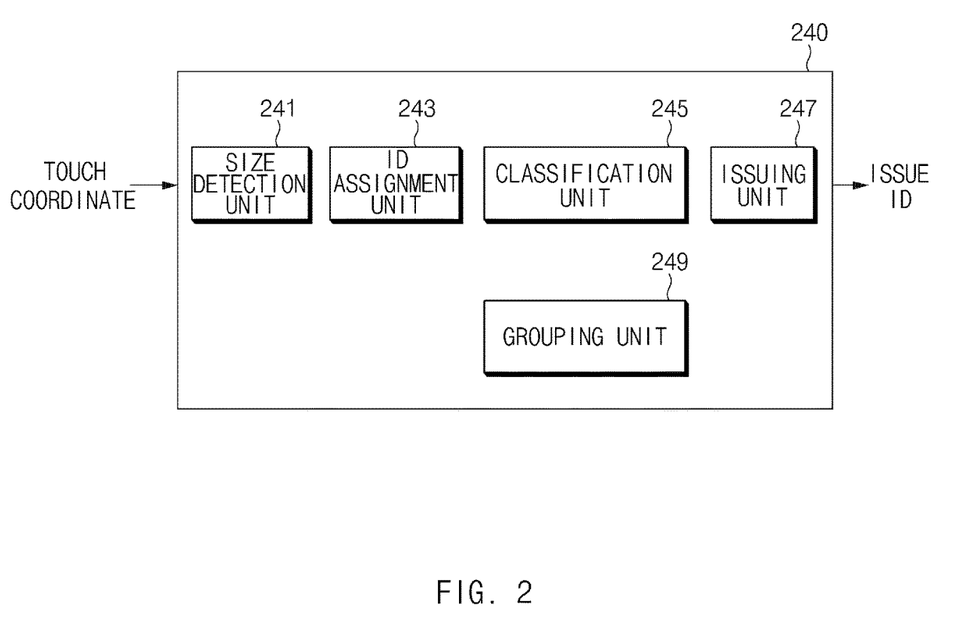
FIG. 2 is a block diagram illustrating a touch controller according to an exemplary embodiment of the present disclosure.

FIG. 2 is a block diagram illustrating the touch controller according to an exemplary embodiment of the present disclosure.

Referring to FIG. 2, according to an exemplary embodiment of the present disclosure, the touch controller 240 may include a size detection unit 241, an ID assignment unit 243, a classification unit 245, a grouping unit 249, and an issuing unit 247. Each of elements of the touch controller 240 may be an individual hardware module or a software module implemented by at least one processor. For example, functions of the modules included in the touch controller 240 may be performed by a single processor or may be individually performed by separate processors, respectively. At least one of the elements of the touch controller 240 may be omitted, or some of the elements of the touch controller 240 may be integrally configured. According to various embodiments, the touch controller 240 may include a memory to store the first information. The input and output relationship described with reference to FIG. 2 is illustrated for the convenience of explanation, but the embodiment is not limited thereto.

According to various embodiments, the size detection unit 241 may detect the size of touch regions based on information on coordinates of touch cells in which touches are detected on the touch panel 210. For example, the size detection unit 241 may periodically notify, to the ID assignment unit 243, the change in the size of the touch regions or the coordinates (e.g., movement) of the touch regions determined on the touch panel 210.

According to various embodiments, the ID assignment unit 243 may assign an individual ID to each touch region, the size of which is detected. For example, the ID assignment unit 243 may determine, based on the output of the size detection unit 241, whether each touch region is a region dragged from a previous touch or a new touch region. If the touch region is the new touch region, the ID assignment unit 243 may assign a new ID to the touch region. According to various embodiments, the ID assignment unit 243 may assign a group ID to a region, which is classified as belonging to the palm region, among touch regions. The ID assignment unit 243 may store ID information, which is obtained by matching individual IDs and a group ID of touch regions belonging to the palm region with each other, in the memory 220. According to various embodiments, the ID assignment unit 243 may cancel the assigned ID in the case that the touch region disappears as a user cancels the touch.

According to various embodiments, the classification unit 245 may classify the types (e.g., a palm region or a pen region) of touch regions assigned with IDs. For example, if the number of the touch regions is less than the threshold number, the classification unit 245 may classify the touch regions as belonging to the pen region. If the number of the touch regions is equal to or more than the threshold number, the classification unit 245 may determine, based on at least one of a shape, an area, or an distance, whether the touch regions correspond to the palm region or to the pen region and thus may classify the touch regions as belonging to the palm region or to the pen region. For another example, if the distance between touch regions, which are the furthest apart from each other, among the touch regions is within the specified threshold distance, and if the shape formed by the touch regions is the reference shape, the touch controller 240 may classify the detected touch regions as belonging to the palm region. The reference shape, which is the shape formed by touch regions when three or more fingers make touches, may be experimentally determined. The threshold number may be three or more. The palm region may be a region in which the eraser function is executed, and the pen region may be a region in which an input function, such as figure drawing, handwriting, zooming-in, or zooming-out, is executed.

According to various embodiments, the classification unit 245 may track a touch region assigned with an ID. For example, the classification unit 245 may tract the change in an individual ID by using ID information, position information, and size information.

According to various embodiments, the classification unit 245 may determine, based on the tracking result of the touch region, whether it is necessary to again classify the type of the touch region, and may again classify the type of the touch region if it is necessary to again classify the type of the touch region. For example, the classification unit 245 may again classify touch regions, which belong to a palm region, as belonging to a pen region if at least one condition is satisfied among conditions that the number of the touch regions belonging to the palm region is decreased to less than the threshold number, the distance between the touch regions is increased to the threshold distance or more, and the area of the palm region is decreased to less than the threshold area, at the present time point. According to various embodiments, in the case that the type of the touch region is classified or classified again, the classification unit 245 may notify, to the ID assignment unit 243 and the grouping unit 249, that the type of the touch region is classified or classified again.

According to various embodiments, the grouping unit 249 may group touch regions, which are classified as one palm region, and may generate region information (e.g., a grouped area and a reference position) of the grouped area. For example, the grouped area may be the whole area of the touch regions belonging to the palm region or may be the area of some of the touch regions. The reference position may have the largest x and y coordinates or the smallest x and y coordinates in the palm region or may be the central position.

According to various embodiments, the grouping unit 249 may adjust the size of the palm region in the grouping procedure. For example, the grouping unit 249 may group the touch regions such that all touch regions are included. The grouping unit 249 may reduce the palm region by a specified region (e.g., a region included in a circle having a specified diameter) from the center of each touch region. The specified area may be set by a user. For example, the user may adjust the size of the specified region (or the palm region) by adjusting the size of an eraser in the input tool. Accordingly, according to various embodiments of the present disclosure, when the input content is erased, the convenience of the user may be improved.

According to various embodiments, the issuing unit 247 may issue ID information of at least one touch region (e.g., a pen region or a palm region) determined at the present time point. In this case, the issuing unit 247 may issue (or report) the ID information to the processor 250 in a link with at least one of type information, position information, and size information.

According to various embodiments, the touch controller 240, which determines touch information (e.g., at least one of an ID, a position, and a size) by determining touch coordinates, detects the type of a touch (e.g., a touch by an eraser or an input touch). Accordingly, the type of the touch may be exactly detected, and the processing load of a processor in a device, which performs a display function, may be reduced.

Figure 3:
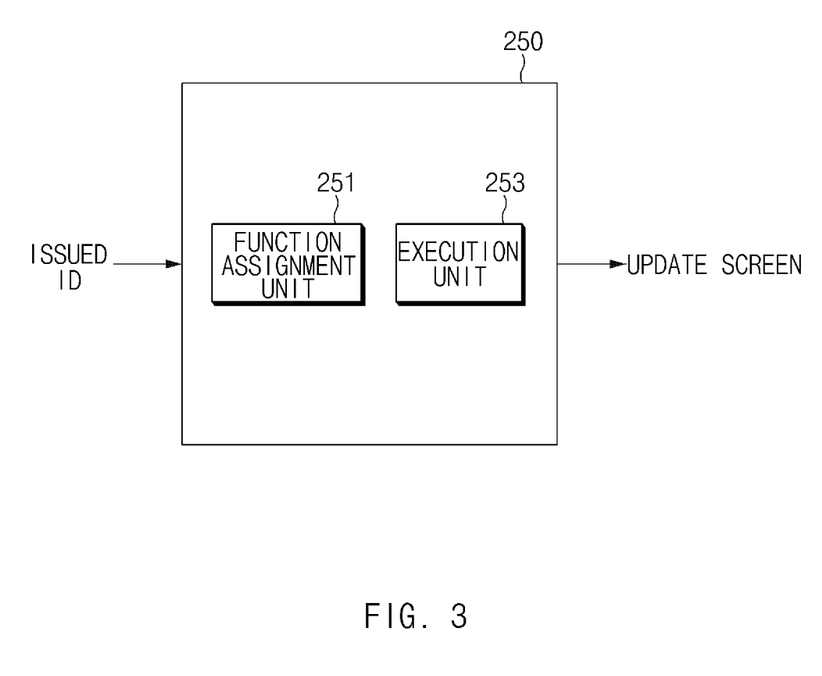
FIG. 3 is a block diagram illustrating a processor according to an exemplary embodiment of the present disclosure.

FIG. 3 is a block diagram illustrating a processor according to an exemplary embodiment of the present disclosure.

As illustrated in FIG. 3, according to an exemplary embodiment of the present disclosure, the processor 250 may include a function assignment unit 251 and an execution unit 253. Each of elements of the processor 250 may be an individual hardware module or a software module implemented by at least one processor. For example, functions of the modules included in the processor 250 may be performed by a single processor or may be individually performed by separate processors, respectively. At least one of the elements of the processor 250 may be omitted, and at least some of the elements of the processor 250 may be configured integrally with each other. According to various embodiments, the processor 250 may include a memory to store the second information. The input and output relationship described with reference to FIG. 3 is illustrated for the convenience of explanation, but the embodiment is not limited thereto.

According to various embodiments, if an ID (new ID) newly issued from the touch controller 240 is recognized, the function assignment unit 251 may assign a first function or a second function to a region corresponding to the new ID based on information on the region corresponding to the new ID. For example, the function assignment unit 251 may assign an eraser function to the region corresponding to the new ID if the size of the region corresponding to the new ID is equal to or more than the threshold size. The function assignment unit 251 may assign an input function to the region corresponding to the new ID if the size of the region corresponding to the new ID is less than the threshold size. According to various embodiments, the function assignment unit 251 may notify, to the execution unit 253, information on the function assigned with respect to the new ID.

According to various embodiments, if the function assignment unit 251 receives, from the touch controller 240, the notification that a previously issued ID is canceled or updated, the function assignment unit 251 may instruct the execution unit 253 to cancel the function (e.g., an input function or an eraser function) assigned to the relevant region.

According to various embodiments, the execution unit 253 may execute the function assigned to each touch region on a screen displayed on the display. According to an exemplary embodiment, the execution unit 253 may execute an input function corresponding to an input tool designated to the pen region on the displayed screen. The input tool may include at least one of tools for line drawing, shape drawing, coloring, text inputting, and figure drawing. For example, if the input tool is a tool for the line drawing, the execution unit 253 may draw a line in the pen region which is changed according to the touch of the user on the screen displayed on the display. According to another exemplary embodiment, the execution unit 253 may execute the eraser function to erase the content previously input in the palm region on the screen of the display. According to another exemplary embodiment, the execution unit 253 may execute the eraser function with respect to the entire palm region or a portion (e.g., the center) of the palm region. As described above, according to various embodiments of the present disclosure, the types of touches are classified and different functions are assigned to the touch regions based on the type of the touches. Accordingly, the touch intention of the user may be more exactly detected, and the functions may be exactly executed. According to various embodiments, if the execution unit 253 is confirmed from the function assignment unit 251 that the function (e.g., the input function or the eraser function) assigned to each touch region is canceled, the execution unit 253 may not execute any function.

Figure 4:
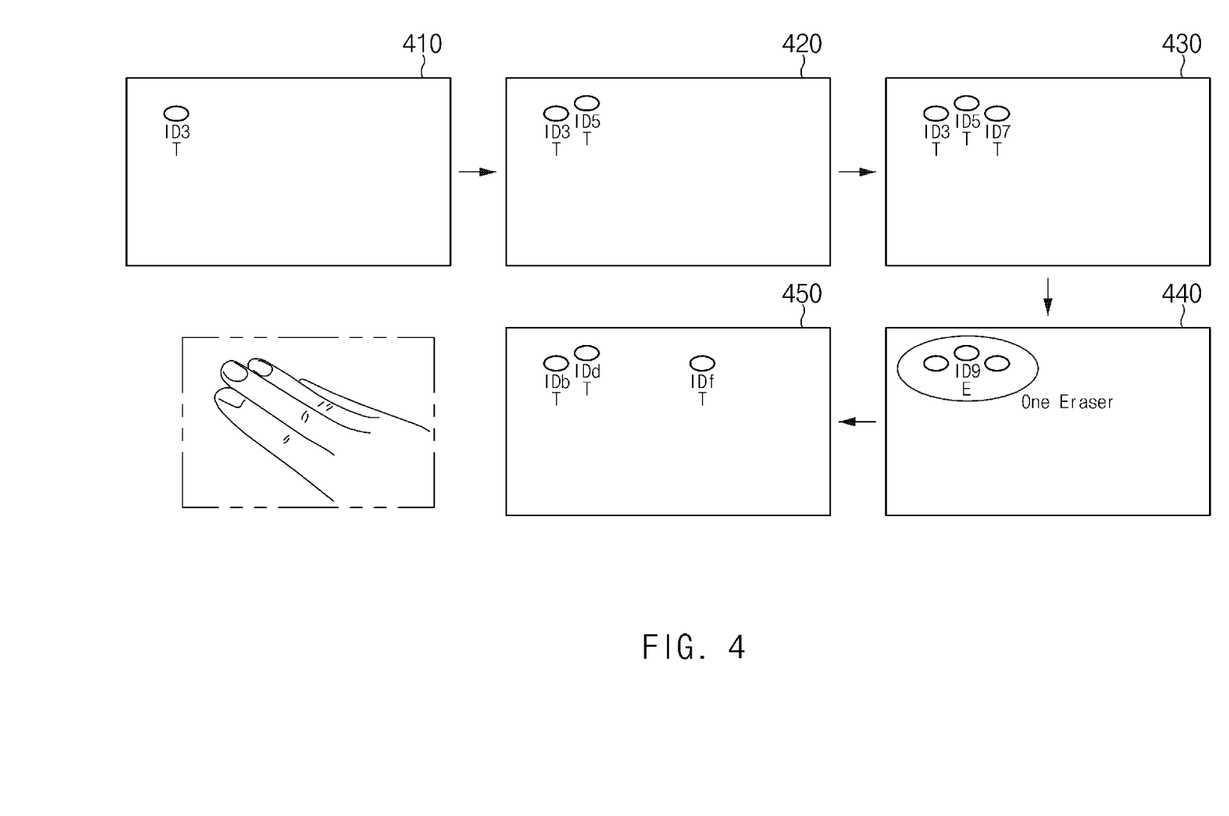
FIG. 4 is a view illustrating a variation detection procedure according to an exemplary embodiment of the present disclosure.

FIG. 4 is a view illustrating a variation detection procedure according to an exemplary embodiment of the present disclosure. In FIG. 4, in states 410 to 450, a solid-line rectangle represents a touch panel and an oval marked on the touch panel represents a touch region touched by a user. In addition, 'T' may represent a pen region and 'E' may represent a palm region.

Referring to FIG. 4, in state 410, if the touch controller 240 determines that a first touch region is detected on the touch panel 210, the touch controller 240 may issue a new ID (ID3) for the first touch region. If the processor 250 receives the ID for the first touch region from the touch controller 240, the processor 250 may assign a specified function to the first touch region.

In state 420, if the touch controller 240 determines that a second touch region is detected on the touch panel 210, the touch controller 240 may issue a new ID (ID5) for the second touch region. In state 420, since the touch to the first touch region is maintained, the touch controller 240 may monitor the change in the position of the first touch region. When the touch controller 240 determines that the position of the first touch region is changed, the touch controller 240 may transmit updated information on the changed position of the first touch region.

In state 430, if the touch controller 240 determines that a third touch region is detected on the touch panel 210, the touch controller 240 may issue a new ID (ID7) for the third touch region. In state 430, since the number of the touch regions assigned with IDs (ID3, ID5, and ID7) is equal to the threshold number of three, the touch controller 240 may determine whether the touch regions assigned with the IDs belong to a palm region. In detail, the touch controller 240 may determine whether the first to third touch regions belong to the palm region, based on at least one of the distances among the first to third regions, and the whole area and shape of the first to third touch regions. For example, the touch controller 240 may determine that the touch regions belong to the palm region, if the distance between the first and second touch regions, which are the farthest apart from each other among the first to third touch regions, is within the threshold distance, and if the shape formed by the first to third touch regions is the reference shape. The reference shape, which is the shape formed by the touch regions when three or more fingers make touches, may be experimentally determined.

In state 440, if the first to third touch regions belong to the palm region, the touch controller 240 may perform grouping for the first to third touch regions, and the touch controller 240 may assign a group ID (ID9), which is a new ID, to the group of first to third touch regions. The touch controller 240 may calculate the area of the group and the reference position of the group.

In state 450, the touch controller 240 may determine that the first to third touch regions are changed into the pen region in the types thereof as the positions of the first to third touch regions are changed (e.g., distance change). For example, if the touch controller 240 determines that the distance between touch regions, which are apart from each other among touch regions belonging to the palm region, exceeds the threshold distance, the touch controller 240 again determines the touch regions, which belong to the palm region, as being in the pen region. The touch controller 240 may cancel the group ID assigned to the palm region including the first to third touch regions and may again assign individual IDs to the touch regions belonging to the palm region. The individual IDs, which are assigned again, may be the same as IDs, which are previously assigned to the touch regions, or may be IDs (IDb, IDd, and IDf) different from the previously assigned IDs as illustrated in state 450.

Figure 5:
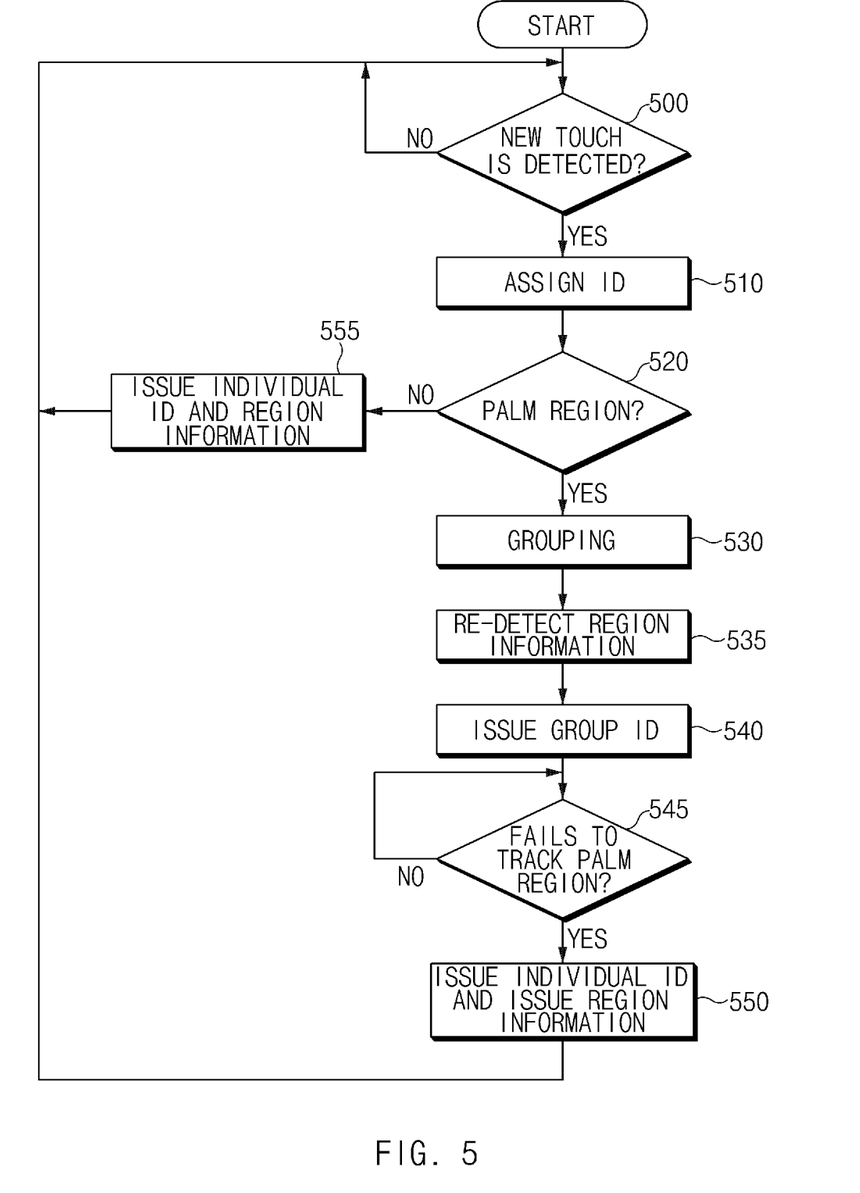
FIG. 5 is a flowchart illustrating a method of detecting a touch in detail according to an exemplary embodiment of the present disclosure.

FIG. 5 is a flowchart illustrating a method of detecting a touch according to an exemplary embodiment of the present disclosure in detail.

Referring to FIG. 5, in operation 500, the touch controller 240 may determine whether there is present a new touch on the touch panel 210. In operation 500, the touch controller 240 may determine whether there is present the new touch based on coordinates of a plurality of touch cells in which the touch is made, and may calculate the size of a new touch region and the size of a previously determined touch region.

In operation 510, if the new touch is detected, the touch controller 240 may assign an ID to the new touch region to distinguish between touch regions. In operation 510, the touch controller 240 may assign an ID to a touch region by making reference to an ID classification system stored in the memory 220. In operation 510, the touch controller 240 may link region information of the touch region with the ID. The region information of the touch region may include the size and the position of the touch region.

In operation 520, the touch controller 240 may determine whether the touch region assigned with the ID belongs to a palm region. For example, the touch controller 240 may determine at least one among conditions that the number of touch regions including the touch region assigned with the ID is equal to or more than the threshold number, the distance between the touch regions is less than the threshold distance, the area of the touch regions is equal to or more than the threshold area, and the shape formed by the touch regions corresponds to the reference shape.

In operation 530, if the touch region assigned with the ID belongs to the palm region, the touch controller 240 may perform grouping and may classify the relevant touch regions as belonging to the palm region. The touch controller 240 may assign a group ID to the palm region.

In operation 535, the touch controller 240 may again detect the region information of the palm region. The region information may include the area and the reference position of the grouped region. For example, the grouped region may be the whole area of the touch regions belonging to the palm region and may be the area of some of the touch regions. The reference position may have the largest x and y coordinates or the smallest x and y coordinates in the palm region or may be the central position.

In operation 540, the touch controller 240 may issue the group ID of the palm region to the processor 250. The touch controller 240 may issue the group ID and the region information while liking the group ID with the region information. Thereafter, the touch controller 240 may track the palm region.

In operation 545, the touch controller 240 may determine whether to fail to track the palm region. For example, the touch controller 240 may determine that the touch controller 240 fails to track the palm region if at least one condition is satisfied among conditions that the number of the touch regions belonging to the palm region is decreased to less than the threshold number, the distance between the touch regions belonging to the palm region is increased to the threshold distance or more, and the area of the palm region is decreased to less than the threshold area, at the present time point.

In operation 550, the touch controller 240 may again issue an individual ID for the touch region, which is currently determined, if the touch controller 240 fails to track the palm region. For example, the touch controller 240 may again issue the previously assigned ID used to track each touch region or may assign a new ID to each touch region to issue the new ID again. The touch controller 240 may issue region information together with the individual ID.

If the touch region is determined as belonging to the pen region, the touch controller 240 may issue the individual ID assigned to each touch region and the region information, in operation 555.

In FIG. 5, the touch controller 240 may branch to operation 500 if a new touch is detected during the execution of each operation. As described above, according to various embodiments, whenever the new touch is detected, the type of a present touch region is classified in combination with another touch region determined at the present time point. Accordingly, the touch may be exactly classified.

Figure 6:
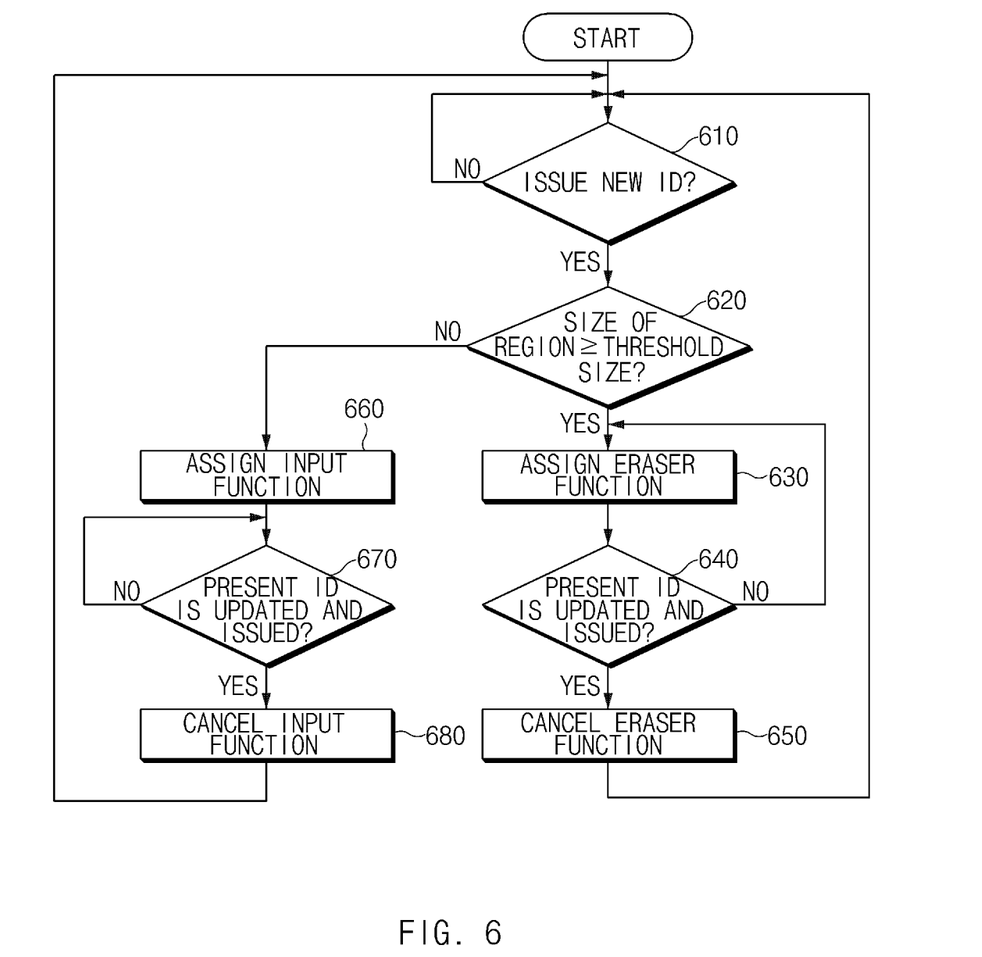
FIG. 6 is a flowchart illustrating a touch control method according to an exemplary embodiment of the present disclosure.

FIG. 6 is a flowchart illustrating a touch control method according to an exemplary embodiment of the present disclosure.

Referring to FIG. 6, in operation 610, the processor 250 may determine whether to receive the new ID which is issued. If the touch controller 240 classifies the type of a touch region corresponding to a new touch and issues an ID (an individual ID or a group ID) corresponding to the new touch, the processor 250 may receive the issued ID.

In operation 620, the processor 250 may determine whether the size of the touch region corresponding to the received ID is equal to or more than the threshold size. For example, the processor 250 may determine the size of the touch region, which belongs to the region information corresponding to the received ID.

In operation 630, the processor 250 may assign an eraser function to the touch region corresponding to the received ID if the size of the touch region corresponding to the received ID is equal to or more than the threshold size.

In operation 640, the processor 250 may determine whether the ID is updated and issued with respect to the touch region assigned with the eraser function. For example, the processor 250 may determine whether a present ID of the touch region assigned with the eraser function is updated and issued by the touch controller 240. The touch controller 240 may update the present ID to an individual ID and may again issue the individual ID in the case that the touch region belonging to the palm region is again classified as belonging to the pen region.

In operation 650, if an ID is updated and issued with respect to the touch region assigned with the eraser function, the processor 250 may cancel the eraser function assigned to the touch region and may branch to operation 610 (or operation 620) to again assign a function to the touch region corresponding to the updated and issued ID.

If the processor 250 determines that the size of the touch region corresponding to the new ID is less than the threshold size in operation 620, the processor 250 may assign an input function to the touch region corresponding to the new ID in operation 660. The processor 250 may recognize an input function selected by the user, and may assign the recognized input function to the touch region corresponding to the new ID.

In operation 670, the processor 250 may determine whether an ID is updated and issued with respect to the touch region assigned with the input function. For example, the processor 250 may determine whether an ID of the touch region assigned with the input function is updated and issued by the touch controller 240. The touch controller 240 may update and issue the present ID in the case that the touch region belonging to the pen region is again classified as belonging to the palm region.

In operation 680, if an ID is updated and issued with respect to the touch region assigned with the input function, the processor 250 may cancel the input function assigned to the touch region and may branch to operation 610 to again assign a function to the touch region corresponding to the updated and issued ID. As described above, according to various embodiments of the present disclosure, the touch controller 240 may classify a touch region at a present time point and may issue an ID of the touch region, thereby reducing the load and the complexity of the processor 250 performing a screen update function resulting from a touch.

Figure 7:
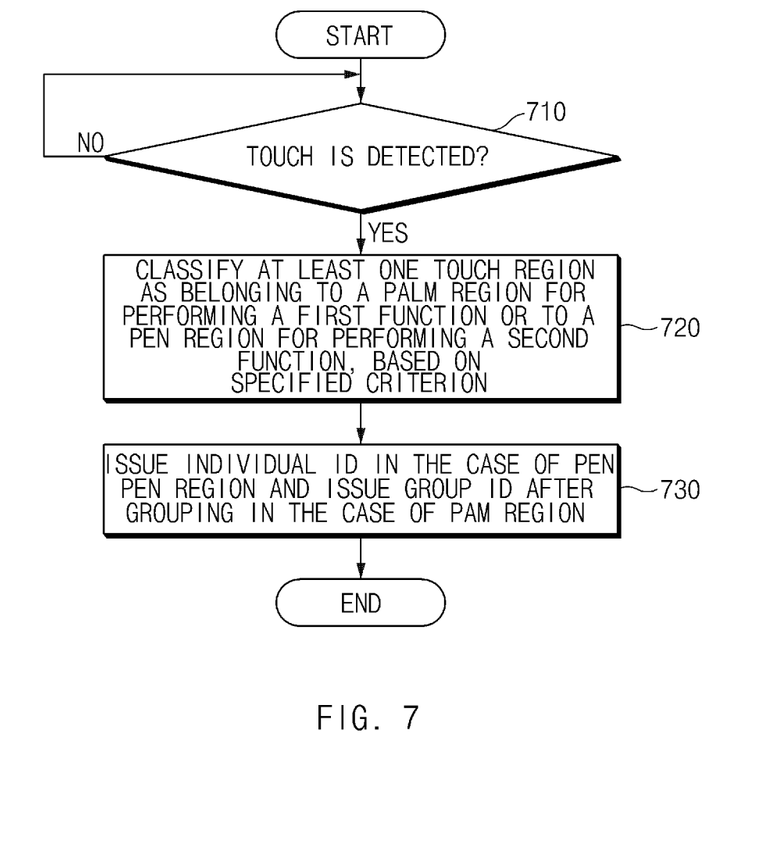
FIG. 7 is a flowchart illustrating a method of detecting a touch briefly according to an exemplary embodiment of the present disclosure.

FIG. 7 is a flowchart illustrating a method of detecting a touch briefly, according to an exemplary embodiment of the present disclosure.

In operation 710, the touch controller 240 may determine whether a touch is detected on the touch panel.

In operation 720, the touch controller 240 may classify at least one touch region as belonging to a palm region for executing a first function or to a pen region for performing a second function based on a specified criterion.

In operation 730, the touch controller 240 may issue an individual ID if the touch region belongs to the pen region. In addition, if the touch region belongs to the palm region, the touch controller 240 may perform grouping with respect to the touch region and may issue the group ID.

The terms of a singular form may include plural forms unless otherwise specified. In the present disclosure, the expressions "A or B", "at least one of A and/or B", "A, B, or C", or at least one of "A, B and/or C" may include all possible combinations of one or more of the associated listed items. The terms such as "first", "second", and the like used herein may refer to various elements regardless of the order and/or priority of the elements and may be used to distinguish an element from another element, not to limit the elements. It will be understood that when an element (e.g., a first element) is referred to as being "(operatively or communicatively) coupled with/to" or "connected to" another element (e.g., a second element), the element may be directly coupled with/to or connected to the another element or an intervening element (e.g., a third element) may be present therebetween.

In the present disclosure, according to the situation, the expression "adapted to or configured to" used herein may be interchangeably used with, for example, the expression "suitable for", "having the capacity to", "changed to", "made to", "capable of", or "designed to" "adapted to", "made to", or "capable of". Under a certain situation, the expression "a device configured to" may mean that the device is "capable of" operating together with another device or other components. For example, a "processor configured to (or adapted to) perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device (e.g. 220).

The term "module" as used in the present disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to an exemplary embodiment of the present disclosure may be, for example, implemented by instructions stored in a computer-readable storage media in the form of a program module. The instruction, when executed by a processor, may cause the one or more processors to perform a function corresponding to the instruction. The computer-readable storage media, for example, may be the memory 220 shown in FIG. 1.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code such as generated by a compiler but also a high-level language code executable on a computer using an interpreter. The above hardware unit may be configured to operate via one or more software modules for performing an operation according to an embodiment of the present disclosure, and vice versa.

A module or a program module according to an embodiment of the present disclosure may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
a memory configured to store a specified criterion for classifying a touch region according to an assigned function; and
a processor configured to:
based on a touch on a touch region of a touch panel being detected, assign an individual identifier (ID) for the detected touch region, and classify the detected touch region as a palm region for assigning an eraser function for erasing displayed content or as a pen region for assigning an input function selected from at least one of a handwriting function, a figure drawing function, a coloring function, a zoom-in function, and a zoom-out function according to a relation between the detected touch region and a previous touch region on the touch panel based on the specified criterion,
based on the detected touch region being classified as the pen region according to the relation between the detected touch region and the previous touch region, issue an individual identifier (ID) to the detected touch region, and
based on the detected touch region being classified as the palm region according to the relation between the detected touch region and the previous touch region, group the detected touch region and the previous touch region as the palm region, and issue a group ID to a group of the detected touch region and the previous touch region, and
where the processor is further configured to:
when the group ID is updated to an individual ID, assign an input function to the touch region assigned with the eraser function, and
when the individual ID is updated to a group ID, assign an eraser function to the touch region assigned with the input function.

2. The electronic apparatus of claim 1, wherein the specified criterion includes at least one of a reference shape, a threshold number, a threshold distance, and a threshold area.

3. The electronic apparatus of claim 2, wherein the processor is further configured to:
classify the touch region as the palm region if at least one condition is satisfied among conditions that the number of touch regions including the touch region and the previous touch region is equal to or more than the threshold number, a distance between the detected touch regions is less than the threshold distance, an area of the touch regions is equal to or more than the threshold area, and a shape of the touch regions corresponds to the reference shape.

4. The electronic apparatus of claim 2, wherein the processor is further configured to:
classify the touch region as the pen region if at least one condition is satisfied among conditions that the number of touch regions including the touch region and the previous touch region is less than the threshold number, a distance between the detected touch regions is equal to or more than the threshold distance, an area of the touch regions is less than the threshold area, and a shape of the touch regions fails to correspond to the reference shape.

5. The electronic apparatus of claim 1, wherein the processor is further configured to:
track the touch region; and
again classify the touch region, which is classified as the palm region, as the pen region or again classify the touch region, which is classified as the pen region, as the palm region based on the specified criterion.

6. The electronic apparatus of claim 5, wherein the processor is further configured to:
issue a group ID after performing grouping for the touch region which is again classified as the palm region, and
issue an individual ID for the touch region which is again classified as the pen region.

7. A display apparatus comprising:
a touch controller configured to:
based on a touch on a touch region of a touch panel being detected, assign an individual identifier (ID) for the detected touch region and classify the detected touch region as a palm region or as a pen region according to a relation between the detected touch region and a previous touch region on the touch panel, the relation between the detected touch region and the previous touch region being included in a specified criterion,
based on the detected touch region being classified as the pen region according to the relation between the detected touch region and the previous touch region, issue an individual identifier (ID) for the detected touch region, and
based on the detected touch region being classified as the palm region according to the relation between the detected touch region and the previous touch region, group the detected touch region and the previous touch region as the palm region, and issue a group ID for both the detected touch region and the previous touch region, and
a processor configured to:
based on an ID issued from the touch controller being received, determine whether an area of a touch region corresponding to the issued ID is equal to or more than a specified threshold area, assign an eraser function for erasing displayed content to a touch region having an area equal to or more than the specified threshold area, and assign an input function selected from at least one of a handwriting function, a figure drawing function, and a coloring function to a touch region having an area less than the specified threshold area, and
wherein the processor is further configured to:
when the group ID is updated to an individual ID, assign an input function to the touch region assigned with the eraser function, and
when the individual ID is updated to a group ID, assign an eraser function to the touch region assigned with the input function.

8. The display apparatus of claim 7, wherein the specified criterion includes at least one of a reference shape, a threshold number, a threshold distance, and a threshold area.

9. The display apparatus of claim 8, wherein the touch controller is further configured to:
classify the touch region as the palm region or as the pen region by using at least one of conditions that the number of touch regions including the touch region and the previous touch region is equal to or more than the threshold number, a distance between the detected touch regions is less than the threshold distance, an area of the touch regions is equal to or more than the threshold area, and a shape of the touch regions corresponds to the reference shape.

10. The display apparatus of claim 7, wherein the processor is further configured to:
   update a screen for the detected touch region assigned with the eraser function or the input function as the eraser function or the input function is executed.

11. The display apparatus of claim 7, wherein the touch controller is further configured to:
   track the touch region and perform comparison with the specified criterion to again classify the touch region, which is classified as the palm region, as the pen region or to again classify the touch region, which is classified as the pen region as the palm region.

12. The display apparatus of claim 11, wherein the touch controller is configured to:
   issue a group ID after performing grouping for the touch region, which is again classified as the palm region, and
   issue an individual ID for the touch region which is again classified as the pen region.

13. The display apparatus of claim 7, wherein the processor is configured to: if an ID is updated and issued as the detected touch region assigned with the eraser function or the input function is assigned again,
   cancel the eraser function or the input function assigned to the detected touch region, and
   again assign a function to a touch region corresponding to the updated and issued ID based on a size of the detected touch region corresponding to the updated and issued ID.

14. A method of controlling an electronic apparatus, the method comprising:
   based on a touch on a touch region of a touch panel being detected, assigning an individual identifier (ID) for the detected touch region and classifying the detected touch region as a palm region for executing an eraser function for erasing displayed content or as a pen region for executing an input function selected from at least one of a handwriting function, a figure drawing function, a coloring function, a zoom-in function, and a zoom-output function according to a relation between the detected touch region and a previous touch region on the touch panel, the relation between the detected touch region and the previous touch region being included in a specified criterion;
   based on the detected touch region being classified as the pen region according to the relation between the detected touch region and the previous touch region, issuing an individual identifier (ID) for the detected touch region;
   based on the detected touch region being classified as the palm region according to the relation between the detected touch region and the previous touch region, grouping the detected touch region and the previous touch region as the palm region, and issuing a group ID for both the detected touch region and the previous touch region;
   when the group ID is updated to an individual ID, assigning an input function to the touch region assigned with the eraser function, and
   when the individual ID is updated to a group ID, assigning an eraser function to the touch region assigned with the input function.

15. The method of claim 14, wherein the classifying of the touch region includes:
   determining whether at least one condition is satisfied among conditions that the number of touch regions including the touch region and the previous touch region is equal to or more than a threshold number, a distance between the detected touch regions is less than a threshold distance based on the specified criterion, an area of the touch regions is equal to or more than a threshold area, or a shape of the touch regions corresponds to a reference shape; and
   classifying the touch region as the palm region if the at least one condition is satisfied.

16. The method of claim 15, wherein the classifying of the touch region further includes:
   classifying the touch region as the pen region if the at least one condition is not satisfied.

17. The method of claim 14, further comprising:
   tracking the touch region and again classifying the touch region, which is classified as the palm region, as the pen region or again classifying the detected touch region, which is classified as the pen region, as the palm region based on the specified criterion;
   issuing a group ID after performing grouping for the touch region which is again classified as the palm region; and
   issuing an individual ID for the touch region which is again classified as the pen region.

* * * * *